United States Patent
Portmann

(10) Patent No.: US 6,651,307 B2
(45) Date of Patent: Nov. 25, 2003

(54) PROCESS FOR MANUFACTURING A PRE-STRESSED FIBER-REINFORCED HIGH PRESSURE VESSEL

(75) Inventor: Heinz Portmann, Calgary (CA)

(73) Assignee: Dynetek Industries Ltd.

(*) Notice: Subject to any disclaimer, the term of this patent is extended or adjusted under 35 U.S.C. 154(b) by 93 days.

(21) Appl. No.: 09/948,795

(22) Filed: Sep. 10, 2001

(65) Prior Publication Data

US 2002/0029449 A1 Mar. 14, 2002

(51) Int. Cl.⁷ ................................................ F17C 1/06
(52) U.S. Cl. .................... 29/452; 29/469.5; 220/589; 156/161; 156/287
(58) Field of Search ........................... 29/890.142, 897, 29/419.1, 421.1, 446, 448, 452, 455.1, 458, 469.5, 527.1, 527.2; 220/588, 589, 590, 591, 581; 156/160, 166, 161, 162, 172, 285, 287

(56) References Cited

U.S. PATENT DOCUMENTS

| | | | |
|---|---|---|---|
| 3,184,092 A | * 5/1965 | George | 29/452 |
| 3,240,644 A | * 3/1966 | Wolff | 156/165 |
| 3,439,405 A | * 4/1969 | Berman et al. | 29/421.1 |
| 3,449,182 A | * 6/1969 | Wiltshire | 156/156 |
| 4,571,969 A | 2/1986 | Tomita | |
| 4,778,073 A | * 10/1988 | Ehs | 220/590 |
| 5,273,603 A | * 12/1993 | Park et al. | 156/175 |
| 5,284,996 A | * 2/1994 | Vickers | 220/590 |
| 5,822,838 A | * 10/1998 | Seal et al. | 29/469.5 |
| 6,425,172 B1 | * 7/2002 | Rutz | 29/421.1 |

FOREIGN PATENT DOCUMENTS

EP 0323247 A1 * 7/1989

* cited by examiner

Primary Examiner—Gregory Vidovich
Assistant Examiner—Jermie E. Cozart
(74) Attorney, Agent, or Firm—Sean W. Goodwin

(57) ABSTRACT

The invention relates to a process for the manufacture of fiber-reinforced pressure vessels and the product produced therefrom. A ductile metal vessel liner, being formed with at least one nozzle, is wrapped with a first composite layer of resin-impregnated fibers. Pressure is applied to the vessel sufficient to yield the liner but is insufficient to cause deformation of the nozzle. The liner retains a residual compressive stress critical for withstanding cyclical service pressures. A second composite layer is applied over the first layer to increase the strength of the vessel sufficient to maintain the vessel's integrity at very high cyclical service pressures (such as about 0–10,000 psig). The vessel is then pressure tested at 1.5 times the intended service pressure to ensure vessel integrity.

10 Claims, 7 Drawing Sheets

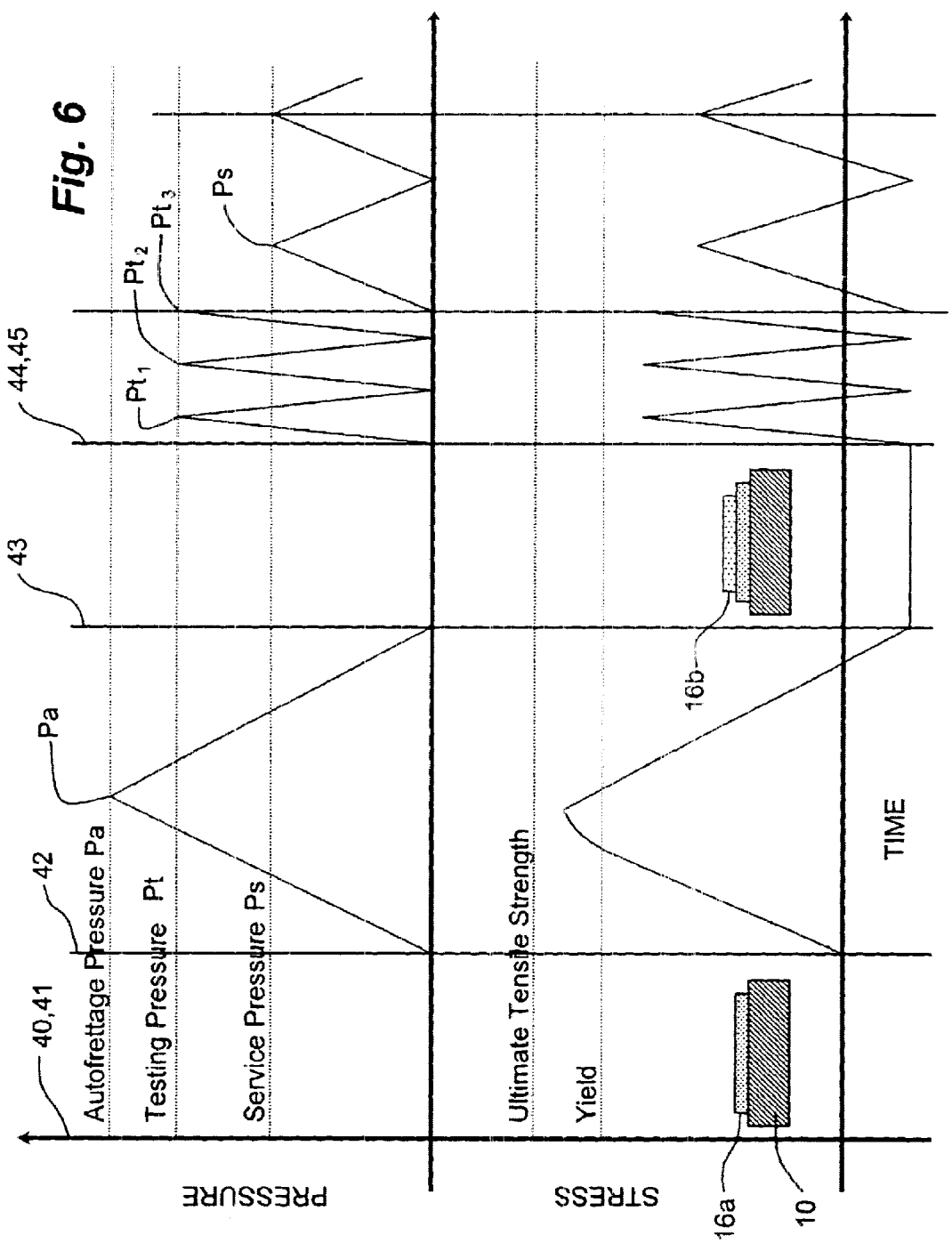

PROCESS FOR MANUFACTURING A PRE-STRESSED FIBER-REINFORCED HIGH PRESSURE VESSEL

FIELD OF THE INVENTION

A process for the manufacture of resin-impregnated fiber-reinforced structural composite vessels and the product resulting therefrom. More particularly, pressure vessels are wrapped in stages with a resin-fibers matrix and are subjected to autofrettage pre-stressing technique to increase the vessel's cycle life and burst strength.

BACKGROUND OF THE INVENTION

It is known to wrap a variety of underlying shapes with fibers embedded in a matrix of resin so as to form fiber-reinforced plastic composite products, or FRP. The fiber acts as the structural portion wrapped over a normally weak shape such as a liner for a pressure vessel.

One such example is the manufacture of fiber-reinforced pressure vessels by wrapping hollow, substantially non-structural pressure vessel liners with fibers resulting in a vessel having burst pressure and cyclical loading capabilities beyond that of the liner alone. Fibers wrapped about the vessel liner act in tension when the vessel is pressurized.

Conventionally, a multiplicity of fibers spooled into tows are passed through heated resin baths containing catalyzed resins prior to being mechanically wrapped onto the vessel liner. The configuration of the winding is dependant upon the speed of rotation of the vessel liner and the rate of travel of the tow-dispensing apparatus. The most common configurations are helical, in which the tows are at a significant angle from the axis of the object being wrapped; circumferential, in which the tows are wound hoop-wise around the object; and polar, in which the tows are wrapped in the direction of the longitudinal axis of the object.

The resin is permitted to dry and is then cured. Curing relates to the process by which the resin is allowed to achieve its final chemical state and effect its purpose to provide reinforcement to the liner. Curing or chemical poly-condensation, is the formation of polymers from monomers with the release of water or another simple substance. Curing is usually performed at elevated temperatures however, room temperature may be sufficient for some types of resins.

In some cases the resulting vessel is pressed into service after curing.

In other known processes, the liner is pre-stressed using a technique called autofrettage wherein the liner is plastically deformed (yielded) within the fiber-wrap for imparting a compressive residual stress into the liner and thereby increasing the vessel's structural characteristics under pressure.

In more detail, a liner forms a fluid nozzle structure for providing access to the liner's bore. In the autofrettage process, the cured fiber-wrapped liner is placed inside a protective housing and liquid is injected through the fluid nozzle structure, over-pressurizing the liner within the wrap and causing it to yield. When the fluid pressure is released, the tension in the liner diminishes and then becomes compressive at ambient pressure (pre-stressed). Accordingly, as the pressure rises once again, in service, the stress on the liner progressively reduces from compressive, through zero, then finally becomes tensile at a peak stress less than that previously experienced at the same pressure. Cyclical tensile stress is a major factor in precipitating fatigue stress failures and thus, with an initial compressive stress, each pressure cycle results in a lower maximum tensile stress in the liner and thus improves its fatigue strength.

It is known to apply autofrettage pressures of 6000 psig to pre-stress aluminum-lined, fiber-wrapped tanks which are safely operable at service pressures of about 3000 psig.

However, increased use of alternative fuels to fuel vehicles, such as compressed natural gas and hydrogen, and the requirement for ever greater fuel range, has created a need for lightweight, safe tanks with even greater capacity. One method for avoiding increasing tank size and weight, new tanks must be capable of containing fuel at higher service pressures, upwards of 10,000 psig. It is possible to provide fiber-reinforced tanks capable of such pressures but without pre-stressing, the cyclical life is too short to be of commercial value. Accordingly a pre-stressing technique is suggested.

Using the prior art process, autofrettage pressures in the range of about 20,000 to 25,000 psig would be required in order to adequately yield an aluminum liner to produce a vessel capable of safely maintaining integrity at a cyclic service pressure of 10,000 psig. Unfortunately, at these high pressures the boss forming the nozzle and the internal threads used to attach various fittings to the tank liner, also yield. As the nozzle structure yields, its dimensions no longer accept conventionally sized valve bodies and fittings. The dimensional changes in this portion of the tank are not predictable, require close fitting tolerances and therefore one is unable to compensate for such deformation when originally sizing the nozzle structure. The deformation of the nozzle structure is related to the surface area of the nozzle, as provided by the nozzle's port size.

One approach to minimize deformation and enable high autofrettage pressures would be to make the nozzle opening much smaller, thereby reducing the service area and lowering the stress. From a practical standpoint however, this does not solve the problem as the smaller openings would no longer be able to accept current valve bodies. Note that more and more components are integrated into the valve bodies, and therefore must be of sufficient size to incorporate components such as solenoid-controlled valves, manual override valves, pressure regulators and temperature control devices.

Further, attempts to thicken the walls or fiber-wrap the boss have only provided marginal increases in strength of the nozzle structure, insufficient to eliminate yield.

U.S. Pat. No. 4,571,969 to Tomita discloses an alternative to single high pressure autofrettage for steel liners operating at service pressures of about 100–200 ksig. Tomita suggests that application of a single pressure is generally disadvantageous in that it does not always produce the required residual tangential compressive stresses in alloy steel cylinder bores. Further, Tomita states that high pressure autofrettage deforms the bore of the cylinder so that it is no longer employable in its intended use, where bore size must be maintained within narrowly prescribed ranges. Tomita teaches a cyclical autofrettage technique applicable to alloy steel cylinders in which the vessel is subjected to multiple lower pressure cycles in order to avoid large diameter dilations and the associated tolerance problems. The rate of production would diminish and costs would escalate if each cylinder were to be cyclically pressurized until a suitable strength was achieved. Further, aluminum liners have a lower yield stress than alloy steel and therefore do not require the extreme pressures suggested by Tomita.

Thus, there remains a need for a process by which a fiber-reinforced pressure vessel can be produced; capable of maintaining its integrity at service pressures upwards of 10,000 psig, with a nozzle structure port and threads which can be reliably sized and retain their dimensions necessary to accept a variety of valve bodies and fittings. Ideally, the process should be accomplished with a minimum number of steps for efficient rates of production.

SUMMARY OF THE INVENTION

The current invention addresses the unsuitability of the existing single cycle autofrettage processes for manufacturing very high pressure reinforced-reinforced vessels for storing fuel gas. High pressure autofrettage is associated with disadvantages including imposing unpredictable and significant deformation of the bore of the vessels threaded nozzles. The novel process also uses a single pressure cycle, but it achieves the objectives of forming a residual compressive stress in the vessels liner using lower pressures, and standard autofrettage equipment by implementing a unique two stage resin-impregnated fiber wrapping process to produce pressure vessels capable of reliably withstanding high service pressures in the range of 10,000 psig.

In a broad aspect of the invention, process for manufacturing a fiber-reinforced high pressure vessel comprises the steps of:

wrapping the liner with a first composite layer of predetermined strength;

applying a predetermined first pressure to the bore, the first pressure being greater than the design pressure and sufficient to yield the liner within the first composite layer and produce residual compressive stress therein; and wrapping the liner with a second composite layer so that when the design pressure is applied, the strain in the liner is constrained so that stress in the liner is below yield.

Preferably the first pressure and the strength of the first composite layer are complementary. A maximum pressure is set which would not damage the nozzle and further that the strength of the first composite layer is set such that the liner can be plastically deformed at a pressure less than that maximum pressure.

More preferably, the ductile metal liner is aluminum and the pressure used to autofrettage the liner is in the order of 15,000 psig, resulting in a product pressure vessel which, in combination with the strength provided by the second composite layer, is capable of cyclical use at design pressures of 0–10,000 psig. More preferably, the pressure vessel is tested using cyclical pressure tests at 1.25–1.5 times design pressure in order to meet safety standards.

Using this novel autofrettage process, the user of the vessel produced thereby can be confident that the vessel has been subjected to at least 1.5 times the service pressure, even with the higher service pressures now sought in the industry.

BRIEF DESCRIPTION OF THE DRAWINGS

FIG. 6 is a graphical representation of the manufacturing steps over time including staged wrapping of the vessel liner, the pressure cycles and the resulting stress curves for the liner.

DETAILED DESCRIPTION OF THE PREFERRED EMBODIMENT

Figure 1:
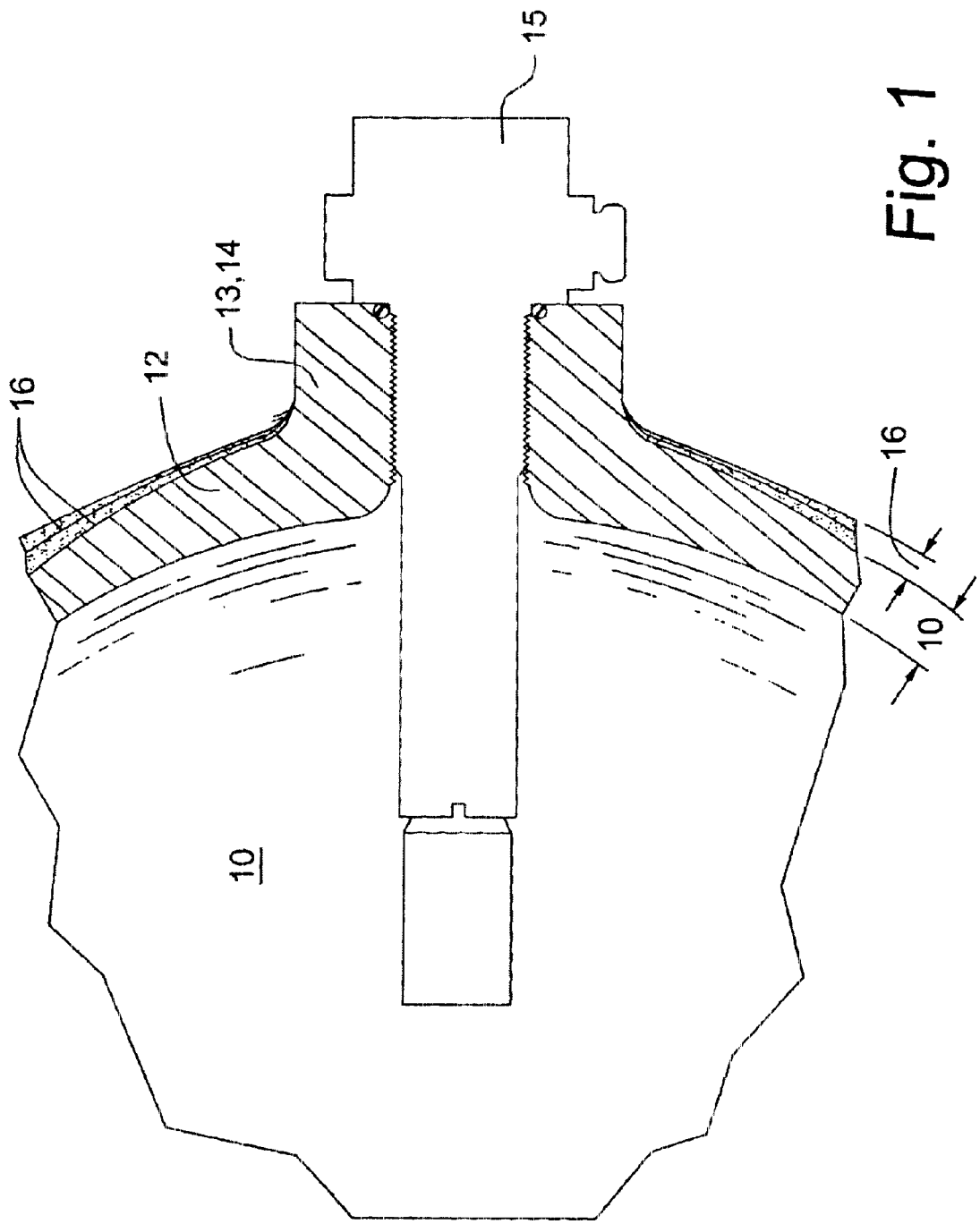
FIG. 1 is a cross-sectional view of a cutaway end of a fiber-reinforced pressure vessel illustrating a threaded nozzle structure fitted with a generic valve assembly.

Having reference to FIG. 1, a portion of a fiber-wrapped vessel liner 10, is illustrated having a cylindrical body portion 11 (see FIG. 3), hemispherical ends 12 formed thereon and at least one boss 13 formed into a threaded nozzle structure or nozzle 14 protruding axially from a hemispherical end 12. The nozzle 14 is shown fitted with a generic valve body 15. A composite layer 16 comprising a matrix of fibers and resin is wrapped about the cylindrical body portion and partially around the hemispherical end 12.

It is understood that reference to a "wrap" or "layer" suggests as many layers of fibers and resin as necessary to obtain the desired strength between distinct process steps. Accordingly, a first wrap or composite layer could include thousands of actual wraps of fibers.

Figure 2:
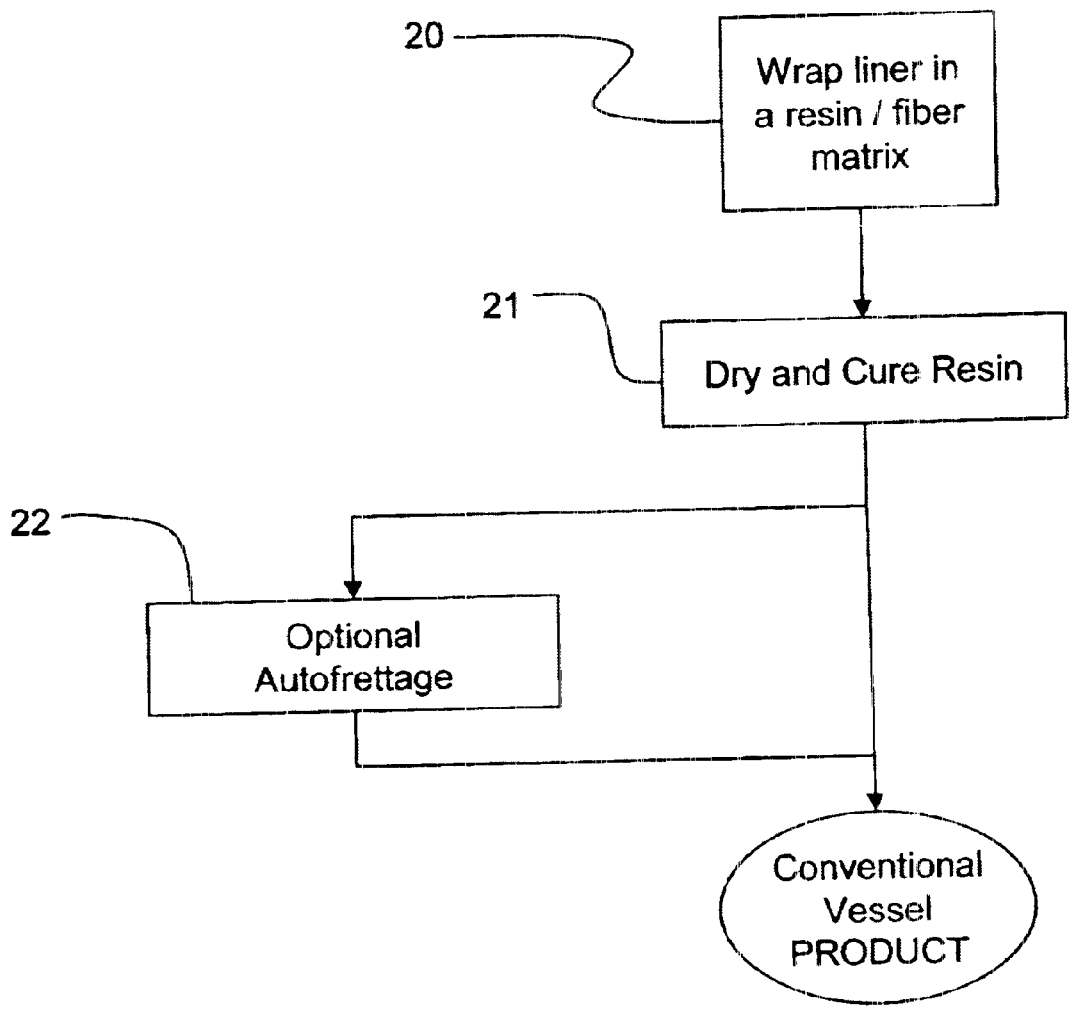
FIG. 2 is a flow chart describing the wrapping, drying and curing process of the prior art which may or may not include autofrettage to produce a conventional fiber-reinforced vessel.

Having reference to FIG. 2, the prior art process is shown in which metal lined fiber-wrapped pressure vessels are produced. The ductile metal liner 1 is first wrapped at 21 with heated resin impregnated fibers. The wrapped liner is allowed to air dry and then is heated in a hot air oven at about 125 degrees Celsius to cause polycondensation or curing of the resin at 21.

Figure 5A:
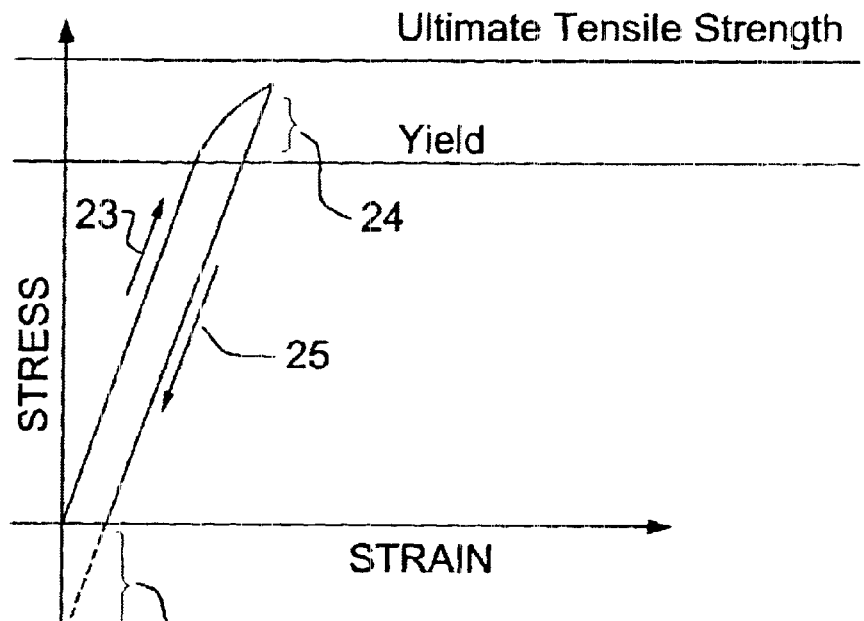
FIG. 5a is a graph illustrating the stress curve for the wall of the liner for autofrettage and demonstrating permanent plastic deformation.
Figure 5B:
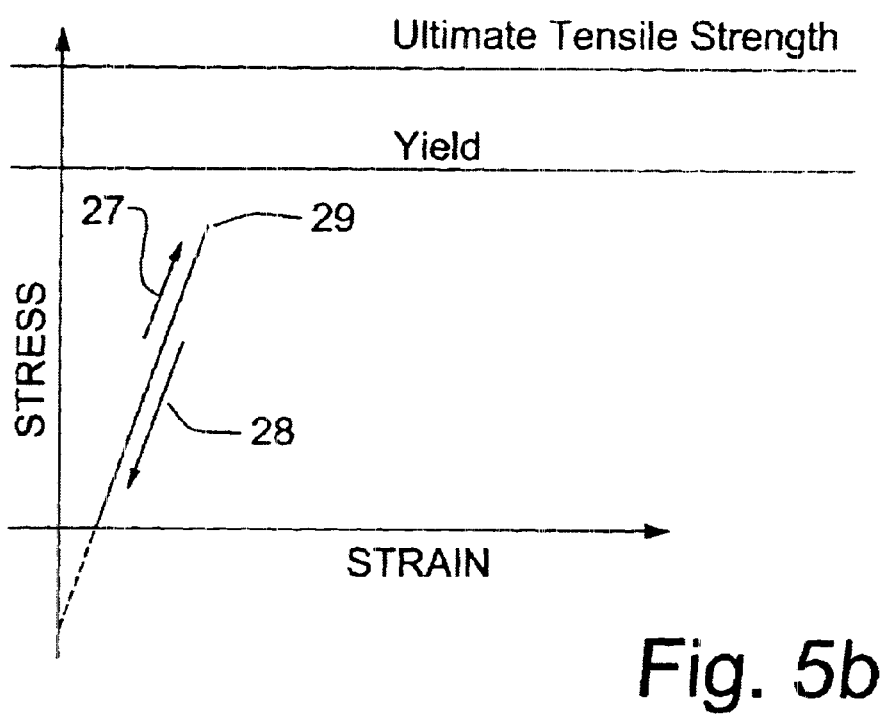
FIG. 5b is a graph illustrating the elastic, reversible stress curve for the pre-stressed wall of the liner during normal pressure cycling and indicating an acceptably low peak stress.

Optionally, the cured, fiber-wrapped liner may then be subjected to autofrettage at 22. Autofrettage is the process of pre-stressing the ductile metal within the composite layer so as to leave a residual compressive stress therein, increasing the ultimate burst pressure and the peak tensile stress for improving fatigue strength. Referring to FIG. 5a, the autofrettage process 22 comprises placing the cured fiber-wrapped liner inside a protective housing and over-pressurizing the liner to impose stresses at 23 and causing it to yield at 24. When the pressure is released at 25, the tension in the liner diminishes and then becomes compressive 26 at ambient pressure (pre-stressed) due to the constraint imposed by the overwrap. Accordingly, as shown in FIG. 5b, on re-pressurization at 27, the stress on the liner is first progressively reduced from compressive, then passes through zero, then finally becomes tensile. Pressure cycles causing tensile stress are a major factor in precipitating fatigue stress failures. With the initial pre-compressive stress, each pressure cycle (pressurization 27 and depressurization 28) results in a lower maximum tensile stress at 29 in the liner and thus improves its fatigue strength.

This prior art process is performed once and the product vessel is presumed ready for service.

Figure 3:
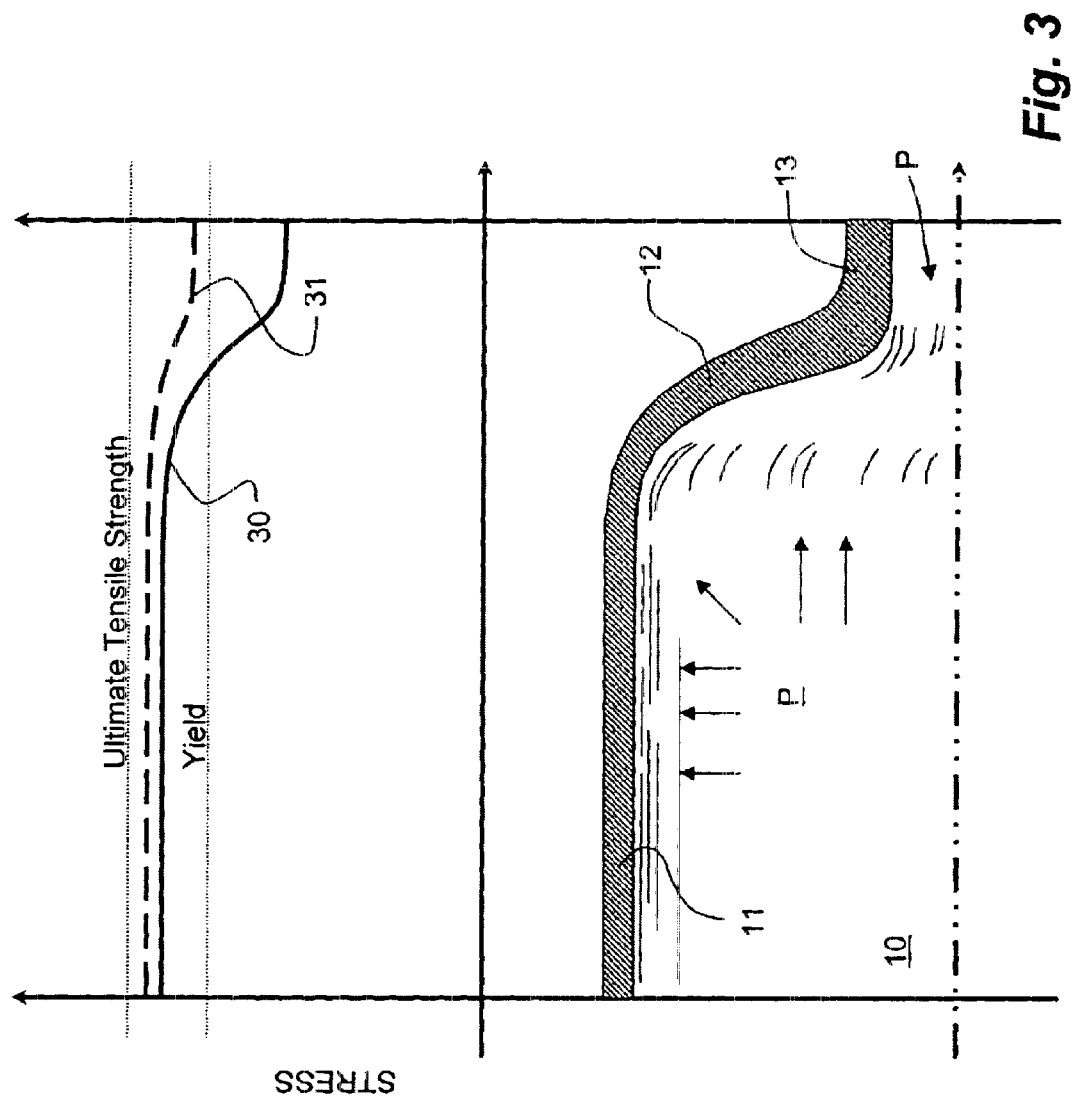
FIG. 3 is a two-section graph illustrating, on the bottom a cross-section of the vessel liner and a nozzle, and on the top the stress profile resulting from autofrettage according to FIG. 2, for conventional pressures (solid line) and at very high pressures (dashed lines) for an appropriately stronger-walled vessel.

Having reference to FIG. 3, pressure P, imposed during autofrettage, strain the liner 10 and results in liner stress. The fiber-reinforcement constrains and prevents the liner from reaching the ultimate tensile strength at which the liner would lose its integrity. Due to the shape and design of the walls of the liner 10, the imposed stresses 30 in the main cylindrical body 11 are greater (above yield) than in the hemispherical ends 12 or the nozzle 14. Typically, an aluminum lined pressure vessel designed for use at 3000 psig is pressurized at 6000 psig to produce sufficient yielding of the cylindrical portion 11 of the aluminum liner 10.

The foregoing constitutes the state of the art for fiber-wrapped liners.

Continuing to refer to FIG. 3, in order to produce lightweight aluminum lined pressure vessels designed for use at high pressures such as about 10,000 psig, the yield pressure Pa used for autofrettage would have to be in the order of 20,000 or 25,000 psig to achieve sufficient yield in the liner. While the composite layer 16 is appropriately strengthened to prevent the cylindrical body 11 from reaching ultimate tensile strength, design constrains on the area of the nozzle 14 limit similar strengthening. Accordingly, under the prior art techniques, pressures in this range however, imposed stresses 31 at the nozzle 14 result in excessive dilations and permanent deformation in the diameter of the threaded nozzle 14. Such deformation subsequently interferes with the insertion of valve body fittings 15, machined by their respective manufacturers to fixed tolerances. Further, the nozzle 14 and valve bodies 15 are typically quite large for accommodating the growing need for more and more components like solenoid operated valves to control the flow of gases out of the pressure vessel, control circuitry to operate the valves, manual override valves and temperature regulation devices.

The process of the present invention reduces the pressure required for autofrettage by using a unique two stage wrapping process and thus maintains the inside diameter of the threaded nozzle 14 within tolerance limits.

Figure 4:
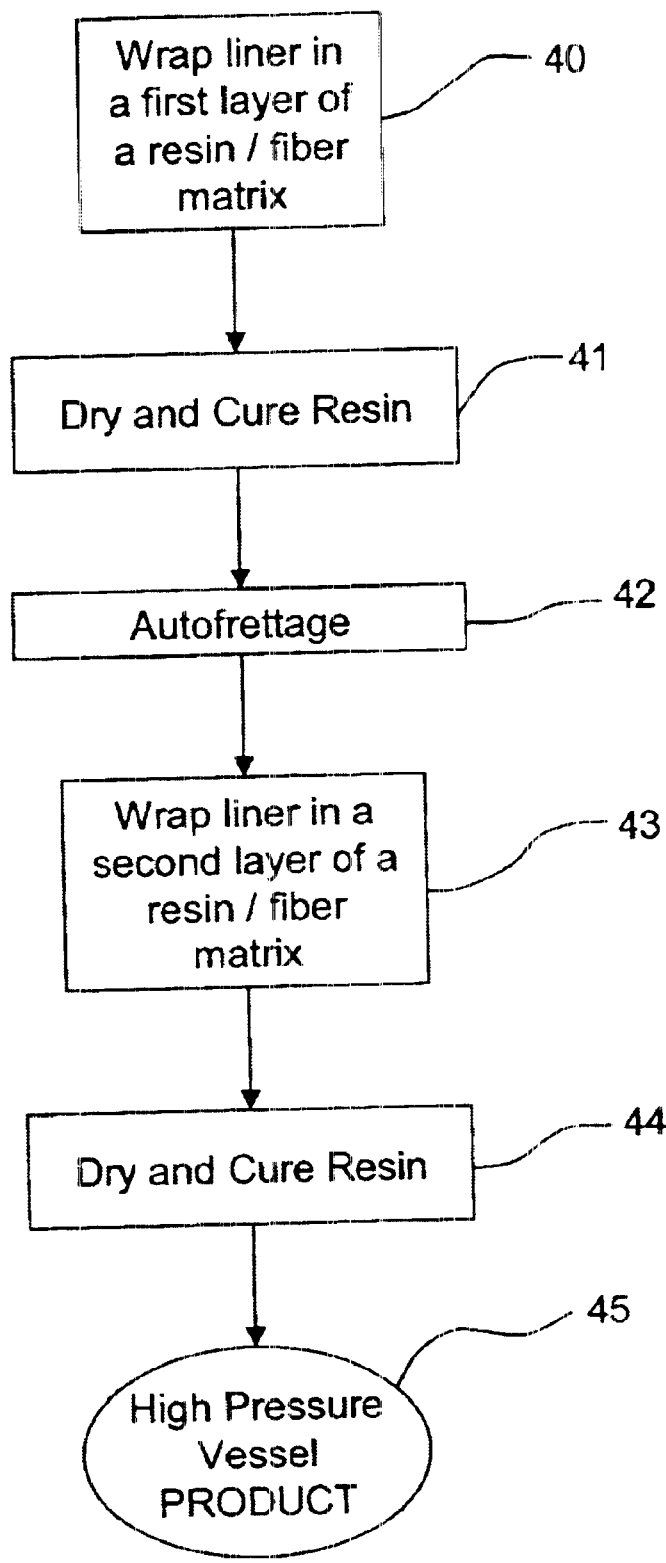
FIG. 4 is a flow chart describing an embodiment of the present invention wherein the liner is wrapped a first time, cured, pressurized to yield, cured, and wrapped a second time.

Having reference to FIGS. 4 and 6, an aluminum liner 10 is first partially wrapped at 40 in a first composite layer 16a. Simply, a partial wrapping 40 results in a first composite layer 16a which provides only enough reinforcement so as to enable the cylindrical liner 10, 11 to be yielded at pressures which are less than those which are damaging to the nozzle 14. The amount of wrapping of the first composite layer 16a and an autofrettage or first pressure Pa are predetermined to enable the liner 10, 11 to yield at the predetermined pressure but sufficiently reinforce the liner 10, 11 to prevent liner failure. For a vessel having service pressures of about 10,000 psig, an autofrettage pressure used Pa (about 15,000 psig) would be lower than that which would be required using the processes of the prior art (about 25,000 psig) to produce a similarly pre-stressed pressure vessel liner. The first composite layer 16a is permitted to dry sufficiently to be subjected to autofrettage.

The partially wrapped liner is pressurized at 20 at the first, autofrettage pressure Pa, causing the liner 10 to yield. The lower pressure ensures that the diameter of the threaded boss is maintained within allowable tolerance limits.

The liner 10 is then wrapped at 42 with a second composite layer 16b of resin and fibers. The subsequent second composite layer 16b, or additional layers, provides additional reinforcement to the liner 10 and additional constraint to limit the magnitude of the strain imposed on the liner 10 at testing and design pressures. The amount of wrapping in the second composite layer 16b is calculated to increase the strength of the vessel sufficiently to meet the designed service pressure Ps.

The resin is then cured at 44 according to the known techniques of the prior art.

Figure 7:
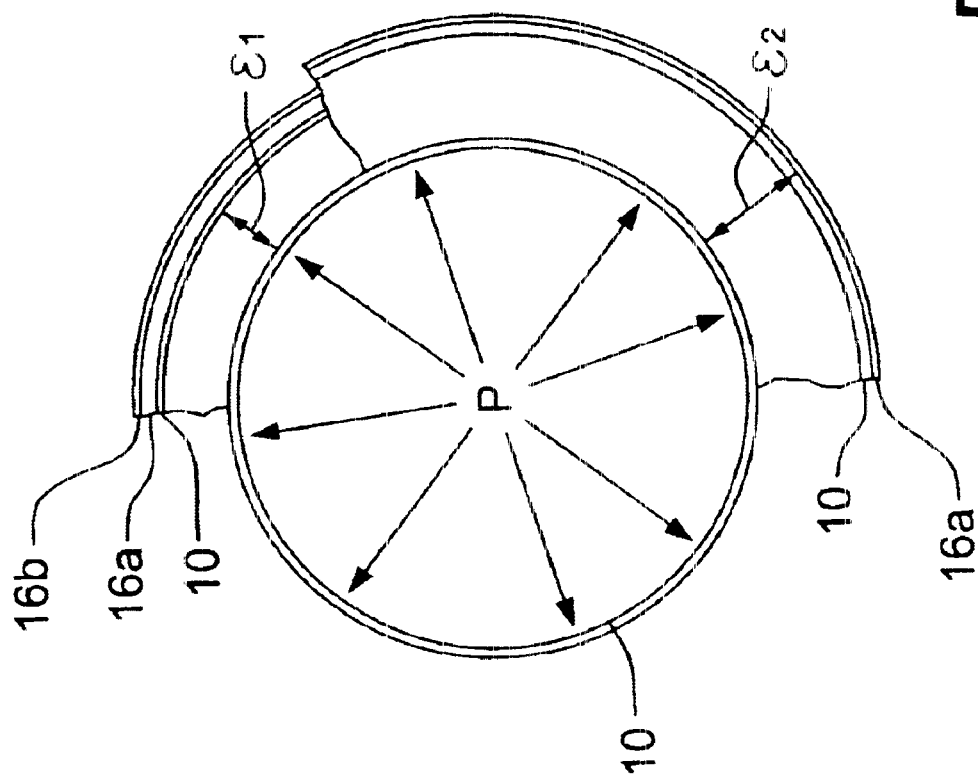
FIG. 7 is an exaggerated and fanciful cross-sectional view of a vessel. The circle represents the unstrained liner. Two partial arcs represent the strain or deflection in the liner after the first and second wrapping, demonstrating the change in the strain and thus the reduced stress in the liner after the second wrapping.

The residual stress present in the liner 10 and the overall strength provided by the second or additional and subsequent composite layers 16b increase the burst strength of the vessel and minimize the cyclical peak stress. As shown in FIG. 7, the amount of strain $\epsilon_2$ following the second wrapping is less than the strain $\epsilon_1$ following the first partial wrapping and autofrettage, assuming a constant pressure P.

Having reference to FIG. 6, after the autofrettage 42, the addition 43 of the second composite layer 16b and the curing 44, the resulting product vessel 45 can be subjected to repetitive pressure cycle testing PT1, PT2, PT3, and so on, to ensure that the fiber-wrapped liner meets accepted performance standards such as those set forth by the Canadian Standards Association. Thereafter, the vessel is ready for commercial cyclical service at the intended service pressure.

In one example of the first embodiment of the invention, an extruded aluminum liner of about 325 mm outside diameter would be partially wrapped in a 4.5 mm thick composite layer of carbon fibers pre-impregnated with epoxy resin and allowed to air dry. Such fibers include carbon or graphite fibers available from Mitsubishi Rayon JP as Grafil 34-700. A suitable epoxy resin is that obtained from Shell, as Epon 826/Epi CURE 9551. Autofrettage could be performed at approximately 15,000 psig, suitable to yield the aluminum liner. The liner would then be wrapped with a second composite layer of a further 4.5 mm in thickness using the same resin-impregnated fibers, followed by curing at 125 degrees Celsius for two hours. The fiber-wrapped liner would thereafter be subjected to a certification testing program. The Canadian Standards Association requires such vessels to be subjected to 11250 cycles at 1.5 times service pressure. For a service pressure of 10,000 psig, the fiber-wrapped liners were tested at 15,000 psig.

The embodiments of the invention for which an exclusive property or privilege is claimed are defined as follows:

1. A process for manufacturing a fiber-reinforced vessel capable of containing a design pressure, the vessel having a ductile metal liner with a composite fiber overwrap, the liner having a bore and forming at least one nozzle structure having a port contiguous with the bore for applying pressure therethrough to the bore, comprising the steps of:

wrapping the liner with a first composite layer of the composite fiber overwrap, of predetermined strength;

applying a predetermined first pressure to the bore, the first pressure being greater than the design pressure and sufficient to yield the liner within the first composite layer and produce residual compressive stress therein; and wrapping the liner with a second composite layer of the composite fiber overwrap so that when the design pressure is applied, the strain in the liner is constrained so that stress in the liner is below yield stress.

2. The process of claim 1 further comprising the steps of:

(a) determining a maximum pressure in the bore which would not cause plastic deformation of the nozzle structure; and (b) setting the predetermined first pressure below the maximum pressure.

3. The process of claim 2 further comprising the steps of:

(a) setting the strength of the first composite layer such that the liner can be plastically deformed at a pressure less than the maximum pressure;

(b) determining a minimum pressure in the born sufficient to yield the liner wrapped by the first composite layer; and (c) setting the predetermined first pressure above the minimum pressure.

4. The process of claim 3 further wherein the predetermined first pressure is about 1.5 times the design pressure or greater.

5. The process as recited in claim 3 wherein the liner is aluminum.

6. A process for manufacturing a fiber-reinforced vessel capable of containing a design pressure, the vessel having a ductile metal liner with a composite fiber overwrap, a nozzle structure, and a bore extending through the nozzle structure, wherein the process comprises;

wrapping the liner with a first composite layer of the composite fiber overwrap;

applying a predetermined first pressure to the liner, the first pressure being greater than the design pressure to produce a tensile stress sufficient to yield the liner within the first composite layer;

releasing the first pressure wherein the liner has residual compressive stress therein; and wrapping the liner with a second composite layer of the composite fiber overwrap so that when the design pressure is applied, the strain in the liner is constrained so that stress in the liner is below yield stress.

7. The process of claim 6 further comprising:

determining a maximum pressure in the liner such that plastic deformation of the nozzle structure occurs; and applying the predetermined first pressure below the maximum pressure.

8. The process of claim 7 further comprising:

providing the first composite layer having sufficient strength such that the liner can be plastically deformed without bursting the first composite layer at the first predetermined first pressure;

determining a minimum pressure in the bore sufficient to yield the liner wrapped by the first composite layer; and applying the predetermined first pressure above the minimum pressure and below the maximum pressure.

9. The process of claim 8 further wherein the predetermined first pressure is about 1.5 times the design pressure or greater.

10. The process as recited in claim 9 wherein the liner is aluminum.

* * * * *